Figure 1:
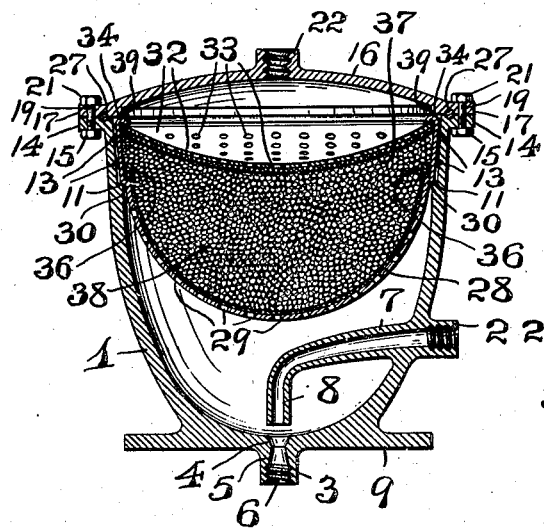

A. W. COLLINS.
FILTER.
APPLICATION FILED MAR. 25, 1915.

1,162,455.

Patented Nov. 30, 1915.

WITNESSES:
Fredk. W. Fraentzel
Eva E. Lesch

INVENTOR:
Adelbert W. Collins,
BY
Fraentzel and Richards,
ATTORNEYS

UNITED STATES PATENT OFFICE.

ADELBERT W. COLLINS, OF NEWARK, NEW JERSEY, ASSIGNOR TO WILLIAM ELSER, OF NEWARK, NEW JERSEY.

FILTER.

1,162,455.  Specification of Letters Patent.  Patented Nov. 30, 1915.

Application filed March 25, 1915. Serial No. 16,848.

*To all whom it may concern:*

Be it known that I, ADELBERT W. COLLINS, a citizen of the United States, residing at Newark, in the county of Essex and State of New Jersey, have invented certain new and useful Improvements in Filters; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in filters; and, the present invention relates, more particularly, to a novel flushing-out means for the apparatus which acts automatically as a wash-out, making possible to cleanse the lower chamber of the device through the combined efforts of the water, gravity and a vacuum arrangement, which is sufficient to draw water through a top outlet and down through the filtering chamber, thus removing any sediment from the apparatus, and especially any sediment adhering to the bottom of a filtering cartridge with which the apparatus is provided.

The invention has for its principal object to provide an automatically operating and self-cleaning purifier or filter for water or other liquids, with a view of providing a simply constructed and efficiently operating apparatus or device, which is readily attached in position, and by means of which filth, mud, and other impurities are automatically flushed out and removed, and clear and filtered liquid is withdrawn from the top of the device.

The invention has for its further object to provide a purifier or filter of the general character hereinafter stated, provided in its side with a fluid or water-intake, arranged water directly over a wash-out outlet, which is formed of such shape and of proper area, that a vacuum is created in the lower chamber of the filter, and thus carries off all sediment and accumulations.

Other objects of this invention not at this time more particularly enumerated will be clearly understood from the following detailed description of the present invention.

With the various objects of the present invention in view, the said invention consists, primarily, in the novel purifier or filter hereinafter set forth; and, furthermore, in the construction of a filter-casing which is circular in form, sloping or tapering downwardly in a continuous line to a washout, thus making it possible to thoroughly cleanse the lower chamber of the device due to the combined efforts of the liquid or water, gravity, and the vacuum arrangement above mentioned, and thereby thoroughly removing all sediment and accumulations.

The invention consists, furthermore, in the novel arrangement within the filter-casing of an inner shell, made in the form of a cartridge containing the filtering or cleansing matter, the said shell being perforated, and the lower part thereof being spherical in shape, with a slightly tapering top, and arranged within the shell to engage suitably disposed packing rings projecting from the inner surface-portions of the main shell, so as to prevent any of the non-filtered liquid or water getting by the filtering chamber. The general design of the shell is such that a maximum amount of filtering surface and of filtering material is provided for, and furthermore producing increased strength with a minimum of metal.

The invention is clearly illustrated in the accompanying drawings, in which:—

Figure 2:
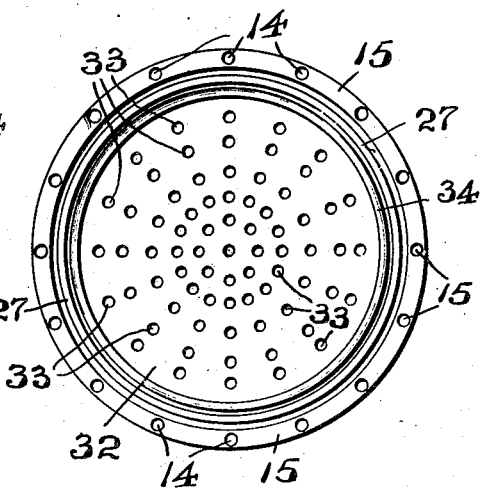
Figures 3, 4:
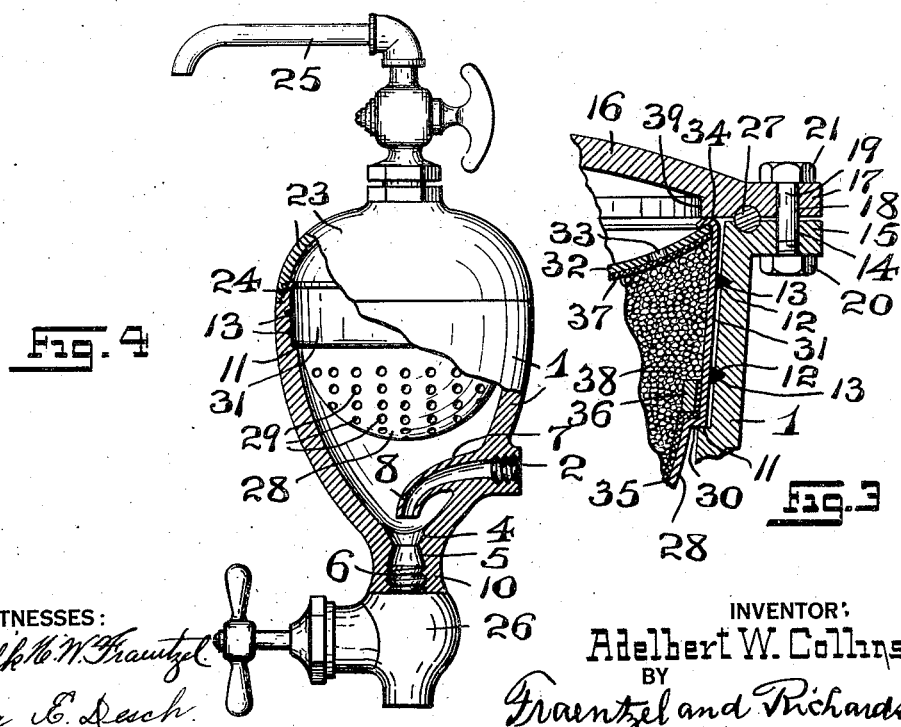

Figure 1 is a transverse sectional representation of a filtering apparatus showing one embodiment of the principles of the present invention, adapted to be secured in a main line through which the liquid to be filtered flows; Fig. 2 is a top view of the apparatus, with the cover removed; and Fig. 3 is a fragmentary sectional representation of the main shell, the cover therefor, and the filtering cartridge, said view being made on an enlarged scale, to illustrate more clearly the arrangement of an inner shoulder upon which the upper portion of the cartridge rests, said view showing also, in enlarged representation, the frictional arrangement of the inner shell of the cartridge with the packing rings connected with the main shell or casing of the apparatus. Fig. 4 is a view, partly in elevation and partly in section, of a filter embodying the principles of the present invention, but adapted for use more particularly with the ordinary water supply pipe, from which the usual tap has been removed, and this form of filter attached in place thereof.

Similar characters of reference are employed in the above described views, to indicate corresponding parts.

Referring now to the several figures of the drawings, the reference-character 1 indicates a main shell or casing of the general configuration mentioned herein-above and shown more particularly in Fig. 1 of the drawings, the said shell or casing being provided in its side with a suitably-formed intake, as 2, for suitable attachment to a supply pipe, and in its conical bottom being provided with a discharge or washout outlet, as 3, the said outlet being preferably formed with the internally disposed cone-shaped or tapering surface-portions 4 and 5, and a screw-threaded portion 6, said portions 4 and 5 forming a suitably contracted outlet, substantially as shown in Figs. 1 and 4, and for the purposes to be presently more fully set forth. Suitably connected with the inner portion of said shell or casing 1, and in communication with the intake 2, is a duct-like element or pipe-member, as 7, which is curved, as at 8, and terminates in an outlet located within the said shell or casing at a point suitably above the said discharge or washout outlet, as shown in said Figs. 1 and 4 of the drawings. In said Fig. 1, the said shell or casing 1 is shown as provided with a suitably-formed base, as 9, for suitably mounting the device in position, while in the construction represented in Fig. 4, the said shell or casing 1 has a contracted neck-portion, as 10, formed with the previously mentioned discharge or washout outlet. I am also aware, that in lieu of this base 9, or said neck-portion 10, the washout portion of the said shell or casing 1 may be otherwise formed. Within the upper portion of the said shell or casing 1, at a suitable distance from the open portion of the shell or casing is an annular offset or shoulder, as 11, and that portion of said shell or casing above said offset or shoulder, is provided with a plurality of internally disposed grooves, as 12, for the arrangement in said grooves of suitably formed packing rings 13 made of any suitable material. While, in the drawings these grooves 12 and packing rings 13 are of triangular configuration, in cross-section, still it will be evident that grooves and rings of other suitable shapes in cross-section may be employed, if desired. In the construction of filtering apparatus represented in Figs. 1, 2 and 3 of the drawings, the said shell or casing 1 is made with an outwardly projecting flange 15, provided with suitably disposed holes or openings 14, and arranged upon said flange 15 is the flange-like rim 17 of a suitably constructed and preferably dome-shaped cover 16 for closing the upper open portion of the shell or casing 1. The said flange-like rim 17 is provided with holes or openings 18, corresponding to the holes or openings 14 in the flange 15, and inserted in the said registering holes or openings are bolts 19 provided with heads 20 and nuts 21 for positively securing the said cover 16 upon the shell or casing 1. In its upper portion the said dome-shaped cover 16 is provided with a suitably formed discharge-outlet, as 22.

In lieu of the dome-shaped cover 16, and the means for securing said cover upon the shell or casing in the manner represented in Figs. 1 and 3 of the drawings, a cover 23 of the form represented in Fig. 4 may be employed, the said cover 23 being screwed upon the upper open end-portion of the shell or casing 1, as at 24, and as clearly shown in said Fig. 4 of the drawings. Connected with the outlets in the respective covers may be a suitable pipe or a suitably formed tap, as 25, and suitably connected with the discharge or wash-out opening in the bottom of the shell or casing may be a suitably constructed stop-cock or other suitable valve-closure, as 26.

If desired, a suitable packing ring, as 27, is placed and secured between the flange 15 of the shell or casing 1 and the flange-like rim 17 of the cover 16, substantially in the manner represented in Figs. 1 and 3 of the drawings.

The previously mentioned filtering cartridge, comprises an inner shell 28, the lower main portion of which is preferably spherical in shape, and is provided with a multiplicity of perforations 29. Near its upper portion the said inner shell 28 is made with an annular offset or shoulder 30 which rests upon the previously mentioned offset or shoulder 11 of the main shell or casing 1, as shown more particularly in Fig. 3 of the drawings. Extending upwardly from said shoulder or offset 30, the inner shell 28 is made with a slightly tapering portion, as 31, adapted to properly engage the previously-mentioned packing rings 13, so as to provide a liquid or water-tight relation between the inner shell 28 and the outer shell or casing 1, as will be clearly evident. Connected with the upper portion of the said inner shell 28 is a suitably dish shaped top or cover 32, forming a suitable closure to the said filtering cartridge, said top or cover 32 being also provided with a multiplicity of perforations 33. Any suitable means for securing the said top or cover 32 to the inner shell 28 may be employed, the means herein shown being by crimping, as at 34. Arranged upon the interior of the said shell 28 is a suitable piece of fabric 35, as asbestos, or any other suitable material, said fabric being suitably fitted in said shell and being lapped over upon the shoulder 30 of said shell 28, being suitably secured in position by means of a clamping or binding ring 36, or other suitable fastening means. In like manner, a piece of fabric 37, as asbestos, or any other suitable material, is arranged upon the under surface of the perforated top or cover 32, and the chamber provided by the said shell 28 and said cover 32 is packed with a suitable filtering medium, as 38.

From the construction and arrangement of the filtering cartridge within the main shell or casing 1 it will be evident, that upon the removal of the cover to said shell or casing 1, the cartridge may be easily withdrawn and replaced by another whenever necessary.

As shown, the annular edge-portion 39 of the cover 16 engages the upper marginal edge-portion of the inner shell 28 so that the latter is forcibly driven against the sides of the packing rings 13, thereby making tight joints, and positively preventing any of the non-filtered liquid or water getting by the filtering chamber. The shape of the top or cover 32 of the filtering cartridge prevents any springing or loosening of the tightly packed filtering material within the inner shell 28.

The method of producing a vacuum in the lower part of the main shell or casing 1 will be clearly understood from the foregoing description, and from an inspection of Figs. 1 and 4 of the drawings, the stream of water coming from the pipe-member 7, in rushing into the interiorly contracted discharge or wash-out outlet 3, producing a suction downwardly within the main shell or casing 1, resulting consequently in a vacuum within said shell or casing, and in continuous lines to the washout outlet, thoroughly cleansing the lower chamber through the combined efforts of the fluid or water, gravity, and the above-mentioned vacuum-creating arrangement, which is sufficient to draw the filtered fluid or water through the top-outlet, and down through the lower chamber, from the washout opening thereof, thus removing any sediment or accumulations adhering to the bottom of the filtering cartridge and contained in the lower chambered portion of the main shell or casing of the apparatus.

While the forms of filtering apparatus herein shown are the preferred forms, still I do not wish to be understood as limiting my present invention to the exact forms herein shown, as I am fully aware that the general shape and form of the filtering apparatus may be changed, and I am still enabled to obtain beneficial results.

I am fully aware, that changes may be made in the general arrangements and combinations of the various devices and parts, as well as in the details of the construction of the said parts, without departing from the scope of the present invention as set forth in the foregoing specification, and as defined in the clauses of the claims which are appended thereto. Hence, I do not limit my present invention to the exact arrangements and combinations of the said devices and parts as described in the said specification, nor do I confine myself to the exact details of the construction of the said parts as illustrated in the accompanying drawings.

I claim:—

1. A filtering apparatus comprising a main shell formed with an intake, and with a washout outlet, a filter material-containing receptacle within said main shell located at a point above said intake, and a conveying means leading from said intake to a point above said washout outlet, arranged and constructed to create a vacuum within said main shell.

2. A filtering apparatus comprising a main shell formed with an intake, and with a washout outlet, a filter material-containing receptacle within said main shell located at a point above said intake, and a duct-like element within said main shell leading from said intake, said element being formed with a curved end-portion terminating at a point above said washout outlet, arranged and constructed to create a vacuum within said main shell.

3. A filtering apparatus comprising a main shell formed with an intake, and with a washout outlet, said outlet having oppositely disposed tapering surface-portions arranged to provide a contracted outlet, a filter material-containing receptacle within said main shell located at a point above said intake, and a conveying means leading from said intake to a point above said washout outlet, arranged and constructed to create a vacuum within said main shell.

4. A filtering apparatus comprising a main shell formed with an intake, and with a washout outlet, said outlet having oppositely disposed tapering surface-portions arranged to provide a contracted outlet, a filter material-containing receptacle within said main shell located at a point above said intake, and a duct-like element within said main shell leading from said intake, said element being formed with a curved end-portion terminating at a point above said washout outlet, arranged and constructed to create a vacuum within said main shell.

5. A filtering apparatus comprising a main shell of a sloping or downwardly tapering form, said main shell being formed in its side with an intake and in its lower portion with a washout opening, said main shell being also provided with an interiorly disposed offset, a filter material-containing cartridge within said main shell, comprising a perforated shell formed with an offset seated upon the off-set of said main shell, a perforated cover connected with the perforated shell of said cartridge, and a cover connected with the said main shell, said cover being provided with a discharge outlet.

6. A filtering apparatus comprising a main shell of a sloping or downwardly tapering form, said main shell being formed in its side with an intake and in its lower portion with a washout opening, said main shell being also provided with an interiorly disposed offset, a filter material-containing cartridge within said main shell, comprising a perforated shell formed with an offset seated upon the offset of said main shell, a perforated cover connected with the perforated shell of said cartridge, a cover connected with the said main shell, said cover being provided with a discharge outlet, and a conveying means leading from said intake to a point above said washout outlet, arranged and constructed to create a vacuum within said main shell.

7. A filtering apparatus comprising a main shell of a sloping or downwardly tapering form, said main shell being formed in its side with an intake and in its lower portion with a washout opening, said main shell being also provided with an interiorly disposed offset, a filter material-containing cartridge within said main shell, comprising a perforated shell formed with an offset seated upon the off-set of said main shell, a perforated cover connected with the perforated shell of said cartridge, a cover connected with the said main shell, said cover being provided with a discharge outlet, and a duct-like element within said main shell leading from said intake, said element being formed with a curved end-portion terminating at a point above said washout outlet, arranged and constructed to create a vacuum within said shell.

8. A filtering apparatus comprising a main shell of a sloping or downwardly tapering form, said main shell being formed in its side with an intake and in its lower portion with a washout opening, said main shell being also provided with an internally disposed offset, a plurality of packing rings within said main shell, said rings being located above said off-set, a filter material-containing cartridge within said shell, comprising a perforated shell formed with an offset seated upon the offset of said main shell, portions of said cartridge-shell located above said offset being in contact with said packing rings, a perforated cover connected with the perforated shell of said cartridge, and a cover connected with the said main shell, said cover being provided with a discharge outlet.

9. A filtering apparatus comprising a main shell of a sloping or downwardly tapering form, said main shell being formed in its side with an intake and in its lower portion with a washout opening, said main shell being also provided with an internally disposed offset, a plurality of packing rings within said main shell, said rings being located above said off-set, a filter material-containing cartridge within said shell, comprising a perforated shell formed with an offset seated upon the offset of said main shell, portions of said cartridge-shell located above said offset being in contact with said packing rings, a perforated cover connected with the perforated shell of said cartridge, a cover connected with the said main shell, said cover being provided with a discharge outlet, and a conveying means leading from said intake to a point above said washout outlet, arranged and constructed to create a vacuum within said main shell.

10. A filtering apparatus comprising a main shell of a sloping or downwardly tapering form, said main shell being formed in its side with an intake and in its lower portion with a washout opening, said main shell being also provided with an internally disposed offset, a plurality of packing rings within said main shell, said rings being located above said off-set, a filter material-containing cartridge within said shell, comprising a perforated shell formed with an offset seated upon the offset of said main shell, portions of said cartridge-shell located above said offset being in contact with said packing rings, a perforated cover connected with the perforated shell of said cartridge, a cover connected with the said main shell, said cover being provided with a discharge outlet, and a duct-like element within said main shell leading from said intake, said element being formed with a curved end-portion terminating at a point above said washout outlet, arranged and constructed to create a vacuum within said shell.

11. A filter material-containing cartridge for a filtering apparatus comprising a perforated shell of spherical conformation, a flexible material mounted upon the interior surface of said perforated shell, a dish-shaped perforated cover for said shell, a flexible material mounted upon the under surface of said cover, and means for securing said cover to said shell.

12. A filter-containing cartridge for a filtering apparatus comprising a perforated shell of spherical conformation, said shell being formed with an offset, and said shell being formed above said offset with a slightly tapering annular top-portion, a dish-shaped perforated cover to said shell, and means for securing said cover to said top-portion of the shell.

13. A filter-containing cartridge for a filtering apparatus comprising a perforated shell of spherical conformation, said shell being formed with an offset, and said shell being formed above said offset with a slightly tapering annular top-portion, a flexible material mounted upon the interior surface of said perforated shell, said material extending over and above said offset, means connected with said last-mentioned portion of the flexible material for securing the same in position, a dish-shaped perforated cover for said shell, a flexible material mounted upon the under surface of said cover, and means for securing said cover to said shell.

In testimony, that I claim the invention set forth above I have hereunto set my hand this 23rd day of March, 1915.

.ADELBERT W. COLLINS.

Witnesses:
 FRED'K C. FRAENTZEL,
 FRED'K H. W. FRAENTZEL.